C. E. F. AHLM ET AL 1,515,321

ELECTROMAGNETIC TRANSMISSION MECHANISM

Filed Nov. 30, 1920      5 Sheets-Sheet 4

Fig.-6

Fig.-7
CRANKING POSITION

Inventors
Charles E. F. Ahlm
Harry J. Hall
By Baker & Macklin
Attorneys

Patented Nov. 11, 1924.

1,515,321

UNITED STATES PATENT OFFICE.

CHARLES E. F. AHLM, OF CLEVELAND HEIGHTS, AND HARRY Y. HALL, OF CLEVELAND, OHIO, ASSIGNORS OF ONE-HALF TO WILLIAM A. NERACHER, OF WARREN, OHIO, AND ONE-HALF TO ALFRED FRITZSCHE, OF CLEVELAND, OHIO.

ELECTROMAGNETIC TRANSMISSION MECHANISM.

Application filed November 30, 1920. Serial No. 427,364.

*To all whom it may concern:*

Be it known that we, CHARLES E. F. AHLM and HARRY Y. HALL, citizens of the United States, residing at Cleveland Heights and Cleveland, respectively, in the county of Cuyahoga and State of Ohio, have invented a certain new and useful Improvement in Electromagnetic Transmission Mechanism, of which the following is a full, clear, and exact description, reference being had to the accompanying drawings.

This invention relates to an apparatus in which power is transmitted from one rotating shaft to another, and in which the speed ratio of the two shafts is controlled electromagnetically. The invention is particularly well adapted for use as a transmission mechanism in an automobile.

The general object of the invention is to provide a construction for this purpose which shall be efficient, simple and compact, and capable of delivering a high torque on low speed, and a high speed when low torque is sufficient. Our mechanism includes two electro-magnetic units, one directly driven by the engine shaft, and the other connected with the engine shaft and the propeller shaft by planetary gearing. The speed changes are effected electro-magnetically by a suitable controller.

Our mechanism eliminates the necessity of a fly-wheel, clutch, transmission mechanism, starting motor and generator, and consolidates into one unit all the necessary mechanism between the engine and propeller shaft of an automobile. We also obviate the necessity of a separate reversing gear, such operation being accomplished by simply applying a brake to the reaction gearing.

The specific features of the invention will be apparent from the following detailed description of a preferred embodiment thereof shown in the drawings.

Referring first to Figs. 1, 2 and 3, 10 designates the main shaft of the mechanism directly connected with the engine crank shaft. This shaft is shown as having rigidly secured to its end, a head 11 which may be bolted to a coupling on the crank shaft (not shown). 12 indicates the driven shaft of the mechanism which is adapted to be connected thru the usual universal joints with the differential of an automobile.

Figure 1:
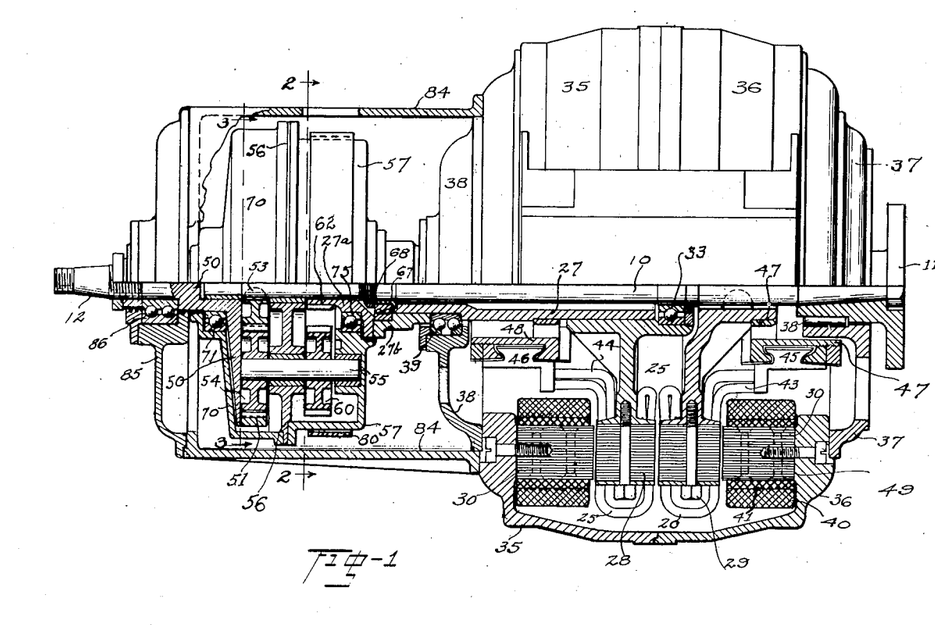
Fig. 1 is a side elevation partly in section of our machine.
Figure 2:
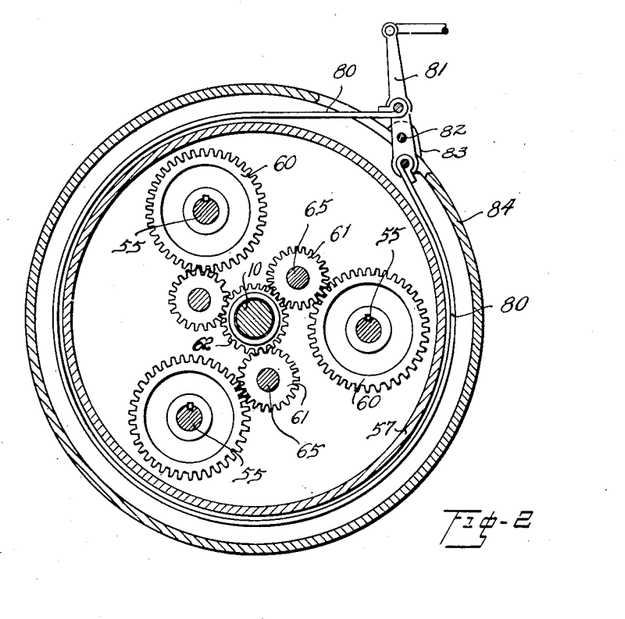
Figs. 2 and 3 are cross sections on the correspondingly number lines of Fig. 1.
Figure 3:
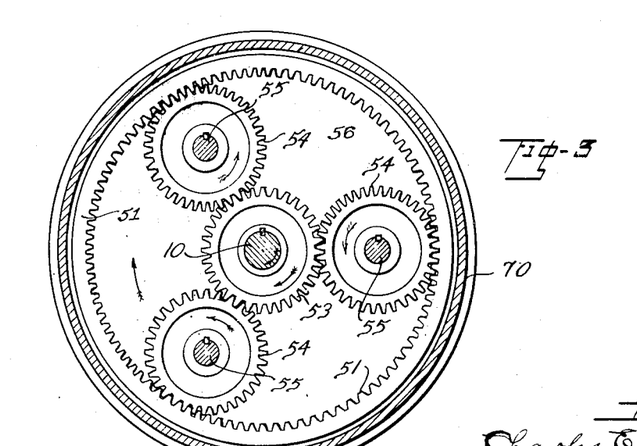

20 indicates the primary electro-magnetic unit which is mounted on and rigidly connected with the shaft 10. This primary unit is in the form of an armature, the field for which may also constitute the field for the secondary unit. This secondary unit has an armature unit 25 lying alongside of the member 20 and mounted on a sleeve 27 surrounding and coaxial with the shaft 10.

As shown, the field structure for the two armature members consists of opposed poles 30 carrying suitable windings and mounted on the inner sides of a stationary ring-like frame preferably composed of two facing cup-shaped parts 35 and 36. This frame is suitably supported by means (not shown) upon the chassis of the automobile. The frame 35, 36 carries at the engine end a stationary dish-like cap 37, which forms a bearing 38 for the shaft 10, a roller bearing being shown about the hub of the head 11. On the opposite end of the frame end 35 is a dish-shaped cap 38 which carries a bearing for the sleeve 27, a ball-bearing 39 being shown for this purpose. The sleeve 27 and secondary member 25 also have a bearing 33 on the shaft 10.

In Fig. 1 we have shown on the pole pieces 30 a main winding 41, and a shunt winding 40, and we prefer to arrange the poles which are opposite each other as north and south poles respectively, the iron portion of each armature member serving to carry the lines of force to the other member. 43 and 44 designate the armature conductors of the primary and secondary unit respectively. These conductors terminate in commutator bars 45 and 46, which are mounted on suitable ring-like members 47 and 48 mounted respectively on the hub of the armature 20 and the sleeve 27. Commutator brushes (not shown) may be held by members projecting thru openings in the end caps 37 and 38. These openings serve also to ventilate the machine.

We have illustrated each armature as comprising an iron member having a hub with a suitable radial web and various laminated disks 28 held on the webs by suitable screw bolts 29. The pole pieces may readily be laminated sheets riveted together and held to the frame by rivets 49, as illustrated in Fig. 1.

It will be seen that our electro-magnetic machine is extremely compact and may be comparatively light is construction. The arrangement of the field windings so that the same field structure acts for both armatures without any intermediate member to carry the flux increases the compactness, and the efficiency is increased by the reduction in the air gap, there being only three air gaps instead of four, as would result if each machine had its own field and armature, as usual. The present invention, however, is independent of the particular form of armature or field.

We will now describe the planetary gearing which connects the propeller shaft with both the engine shaft and the secondary sleeve. The propeller shaft 12 has a cup-like head 50 carrying an internal gear 51. Rigidly secured to the main shaft 10 is a sun gear 53 in the same plane with the internal gear 51. Between the sun gear and the internal gear are planets, three being shown and designated 54, these planets meshing with both the sun gear and the internal gear. The planets 54 are rigidly secured to short shafts 55 which are rotatably mounted in a disk-like member 56 loosely journaled on the shaft 10. Rigid with this disk-like member 56 is a cup-like member 57 in which the other end of the shafts 55 have a bearing. Between this bearing and the bearing in the member 56 these shafts have tightly mounted on them planetary gears 60 of the same size as the gears 54, and meshing with idlers 61, which mesh with a sun gear 62 on an extension 27ᵃ of the sleeve 27. The idlers are mounted on shafts 65 which may be mounted in the members 56 and 57.

The extension 27ᵃ is rigidly bolted to a sleeve 27ᵇ which is tight on the sleeve 27. The parts 27ᵃ and 27ᵇ are in effect part of the sleeve, and will be so referred to herein, but for convenient installation and the provision of suitable bearings they are preferably made of detachable parts. The sleeve 27ᵇ is preferably threaded on the sleeve 27 and serves to clamp one of the race members of the bearing 39; it also carries the outer race member of the bearing 67, the other member of which is clamped to shaft 10 by a nut 68.

Rigid with the planetary carrier 56 and 57 referred to is a third member 70, which with the member 57 forms a complete casing for the planetary gearing. 71 indicates a suitable bearing between the member 70 and the hub of the propeller shaft head 54. A bearing 75 is also provided between the member 57 and the sleeve extension 27ᵃ.

It will be seen that the construction described provides planetary gearing between the main shaft 10, the propeller shaft 12, and the secondary electro-magnetic unit 25, adapted to produce the following results:—
If the secondary be stationary the propeller shaft will be driven in the same direction as the main shaft and at a lower speed through the planetary reaction; if the propeller shaft be stationary the secondary through planetary reaction will rotate in the opposite direction to the main shaft and at a higher speed; if the planetary cage be held so that the axes of the planets can not travel, the gears act as train of spur gears and rotate both the propeller shaft and the secondary in the opposite direction to the engine shaft, the propeller shaft being slower and the secondary faster than the engine shaft. Various degrees of movement may be transmitted to the propeller shaft by electromagnetically causing the secondary to lag behind the movement which the planetary gearing tends to give it.

To reverse the car, we simply apply a brake to the planetary cage which, when it holds this cage stationary, causes the planets 54 to act simply as idlers between the sun gear 53 of the internal gear 51, thus giving the propeller shaft a rotation in the opposite direction of the shaft 10. Slippage of the brake will allow the propeller to have a compound movement, partly by this idler gear transmission and partly by the planetary transmission.

The rotatable housing 57 provides a very convenient member for the application of a reversing brake. Thus, we form this housing member 57 with an external cylindrical surface which is embraced by a brake band 80 provided with suitable operating mechanism, for instance, a lever 81 to which the ends of the band are secured and which is pivoted at 82 to a suitable stationary member. As shown, this lever is pivoted to an ear 83 on a casing 84, which surrounds the rotatable planetary mechanism described and is rigidly secured to the main frame member 35. 85 designates an end cap for the casing 84, and this end cap carries a bearing 86 for the propeller shaft.

While it has been necessary to describe in detail the particular structure shown, our invention is independent of many of these specific details, as will be readily understood from the description of the electro-magnetic operation which now follows:

In our machine, each electro-magnetic unit (comprising, respectively, the armature member 20 with a field, and the armature member 25 with a field) is at times a generator and at other times a motor. The current generated by either machine may be used by the other to contribute torque or speed to the driven member, the surplus current going into the storage battery. In cranking, this battery current may operate both units as motors, and in certain running positions both units may be generators, one of them charging the battery.

In running the propeller shaft receives its power from the main shaft 10, partly mechanically thru the gearing and partly electro-magnetically, either by reason of the primary boosting the engine where high torque is required, or by means of the secondary thru the gearing contributing to the rotation of the propeller shaft. It follows that with a given speed or rotation of the engine shaft the propeller shaft may receive all speed within the range of the mechanism by simply electrically varying the relative rotation of the primary and secondary. This variation is effected by a suitable controller and circuits and resistance governed thereby, as will be hereinafter more fully explained.

Figure 5:
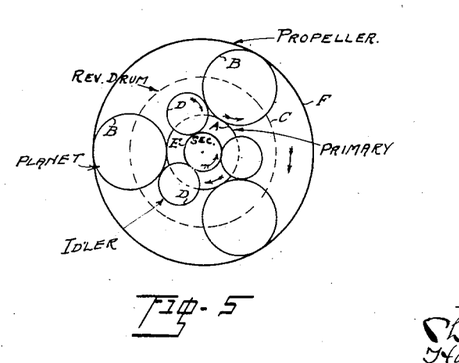
Fig. 5 is the diagram illustrating the relative rotations of the different parts of the mechanism.

The fundamentals of the gearing connection are illustrated in the diagram Fig. 5. In the diagram A corresponds to the sun gear 53, which is rigidly connected at the engine shaft, as is also the electric armature member 20. The member A, therefore, may be designated "the primary". B indicates the two sets of planet gears 54 and 60, which are rigidly connected by the shaft 55, and thus may be considered a single broad gear meshing with both the primary sun A and the idlers D, corresponding to the gears 61. These idlers mesh with the secondary sun 62, (which by means of the rigid sleeve members 27$^a$, 27$^b$, and 27 is connected with the secondary armature 25) this sun being indicated by the circle E, which may be referred to as "the secondary". The propeller rigidly connected with the internal gear 51 meshing with the gears 54 in the diagram is indicated by F. C in the diagram indicates the rotary carrier for the planets and idlers, which, in mechanical construction, is composed of the plate 56 and the housing members 57 and 70, all of which rotate as a unit. As the member 57 constitutes the drum to which the brake band 80 is applied for effecting reversing, this whole member, designated C, may be conveniently referred to as "the reversing drum".

Due to the mutual gear connection between the various parts, the operation of the propeller shaft, the reversing drum and the secondary will be mutually dependent, and the results to any two of them from a given speed of engine shaft rotation depends on the condition of the other one of these three mutually connected members. It will, therefore, be convenient to consider what happens when any one of these three members is stationary, assuming always that the engine shaft is making a definite speed of rotation.

Let us assume, by way of illustration that the speed of rotation of the engine shaft be 600 revolutions per minute, which is accordingly the speed of rotation of the primary sun A in Fig. 5. Also assume that the diameter of the primary sun A is 1/3 of the diameter of the internal gear F, and that the secondary sun E is 1/2 of the diameter of A. The planetaries B will then, of course, be of the same diameter as A.

Let us take first the condition when the reversing drum is held stationary, as it may be by the application of the brake band 80. This may be expressed by the statement that C equals zero. Now, if the primary A be given one rotation, the gear B will have one rotation and the idler D will transmit two rotations in the opposite direction to the secondary E, which will thus have minus two rotations. At the same time the propeller shaft will have been driven in the reverse direction 1/3 of a rotation by the complete rotation of the gear B on the now stationary axis.

The above gives us the following results:

$A = 1$
$C = 0$
$E = -2$
$F = -1/3$

Multiplying this by 600 to give the primary the assumed rotation, we have $A = 600$
$C = 0$
$E = -1200$
$F = -200$ Now, if F (the propeller shaft) should be held stationary (as it may be by applying the vehicle brake not shown) then with each rotation of the primary sun A the planets B, which are of the same size, must make one rotation, and in doing this they must roll on the now stationary internal gear F. The pitch circle of this gear is three times the circumference of the gear B and, therefore, when B rolls once around on the gear F, its axis travels 1/3 of a rotation. For the planetary system to make a complete rotation, it is therefore necessary for the B gears to make three rotations, and this requires four rotations of the primary A, that is, three rotations on account of the three required rotations of the planets B, and one rotation on account of the travel of the axis of these planets. Now, for each rotation of the gear B, the secondary E, which has half the diameter, receives two rotations and in the opposite direction due to the idler D. Accordingly the three rotations of the planets then give minus six rotations of the secondary, but the whole travel of the planetary system takes up one rotation in the plus direction, so that the net result is minus five rotations for E.

In accordance with the above we have the following results:

A = 4
C = 1
E = —5
F = 0

Now as we assume that A is to have 600 revolutions, we multiply the above figures by 150, giving us the following:

A = 600
C = 150
E = —750
F = 0

Under these circumstances the secondary is rotated in the opposite direction by the primary and at a speed 25% in excess thereof. The car being stationary, the only operation is to charge the battery.

If it be desired to plot the curves illustrating the mutual speed ratios of the different members, this may be readily done from the equations above given, since these equations give us two points on each curve, and, as the gearing cannot change, the ratios must be proportional for all other speeds and, hence, each curve must be a straight line. Therefore, locating points on a chart corresponding to the equations given, and drawing a straight line thru the two points for each member, we have a chart of four straight lines corresponding to Fig. 4.

Figure 4:
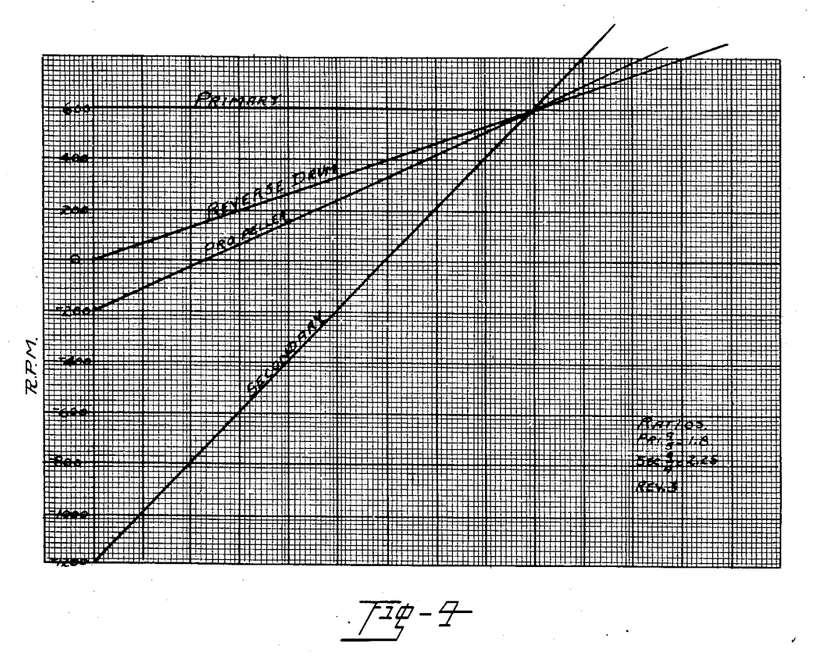
Fig. 4 is a chart illustrating the mutual speed ratios of the various members of the transmission mechanism.

Explaining the chart, Fig. 4, more in detail, we rule a sheet with horizontal lines representing convenient numbers of rotations, and we select one of the intermediate horizontal lines as a zero line. As the engine speed is constant it will be represented by a horizontal line the proper distance above this zero line. We are assuming that the engine makes 600 revolutions per minute, and therefore, the primary line is drawn at 600.

The reversing drum line has one point at zero as indicated by the first set of equations, and another one intermediate of zero and the primary line. We, therefore, select a point on the zero line, and another point further along in the chart above the zero line equal to 150 revolutions, and draw the line representing the reversing drum thru these two points. When the reversing drum is zero, the propeller shaft is making minus 200 revolutions, and when the reversing drum is rotating 150 revolutions the propeller shaft is zero. We, therefore, select directly below the reversing drum points of zero and 150, these two points of minus 200 and zero for the propeller shaft line, and draw a straight line thru these two points. Similarly the two sets of equations give us for the secondary minus 1200 and minus 750, and selecting these two points we have two points on the secondary.

All the lines on the chart will meet at a point where speed or rotation of all the parts is the same, which must be plus 600, as that is the constant speed of the primary. As proving these lines will all meet in a point, consideration may be given as to what would take place if the secondary were rotating in the same direction and at the same speed as the primary. We would then have A equalling plus 600 revolutions, and E equalling plus 600 revolutions. Now, the 600 revolutions of A would give minus 600 revolutions to B. For B to revolve in the minus direction 600 times, while E is revolving the plus direction 600 times, it is necessary for B to travel 600 revolutions, and such travel would give the reversing drum plus 600 revolutions. As the travel of B would counterbalance the revolutions thereof, this gear would act as a strut between A and F, causing F to have the same number of revolutions as A, or plus 600 per minute.

If now we subdivide our chart vertically into units denoting time, we have a graphical illustration of the speed ratios of the various members at any given time.

It will be seen from the chart that, as already stated, when the reversing drum is held at zero the propeller shaft rotates in the opposite direction at a reduced speed, which is proper for reversing movement of the car. The point where the propeller line crosses the zero line is the standing position of the car, the secondary is then rotating in the reverse direction to the primary and at an increased speed. As the speed of the propeller shaft increases, that of the secondary becomes equal to it and then gradually less until when the propeller shaft is making 333.33 revolutions per minute the secondary is stationary; thereafter the secondary revolves in the same direction as the primary, though at a slower speed until the point is reached where all the members are rotating at the same speed. Above this speed, the propeller shaft, the secondary and the reversing drum are all rotating at a faster speed than the primary, as indicated by the chart.

If we wish to obtain from this chart in numerals the ratios of the different rotations to the engine we will measure them easiest on the first time line. At this point the reverse drum is zero, the primary 600, the propeller minus 200 and the secondary minus 1200. The ratio of the engine to the propeller shaft is therefore 600 to 200 or 3 to 1, which is the maximum gear reduction we can obtain, because the reverse drum can go no slower than zero; that is, there is no means for driving it in the opposite direction.

For the ratio of the propeller shaft to the secondary we have from the primary to the secondary a distance of 1800 units (600 plus 1200) while from the secondary to the propeller shaft we have 1200 minus 200, or 1000. This gives a ratio of 1000 to 1800, or 5 to 9. Therefore five-ninths of the power of the engine goes to the propeller shaft directly, and four-ninths thru the secondary.

Putting the above in per cents we have a primary torque 55.55, and a secondary torque 44.44. This means that if we count no loss in transmission, slightly more than 55% of the engine torque goes mechanically to the propeller shaft, slightly less than 45% goes thru the electric machine to the propeller shaft.

A high percentage of the torque through the secondary has the advantage of giving a high torque ratio, but it has the disadvantage of requiring a larger electrical unit and vice versa. The ratios given have been selected after much trial to give a sufficiently high torque ratio with the size of the unit reduced as much as possible, to make it a practical size for automobile use.

In order to accomplish the accelerations and speed conditions illustrated in the chart, five controller positions have been provided. Approximately speaking, the first position corresponds to the low gear, the second and third to the intermediate, and the fourth and fifth to the high gear of a car as ordinarily geared. The controller is used in a similar manner to the gear shift, the actual speed variations being accomplished by the engine throttle in the usual manner.

As the speed of the secondary, when the propeller shaft speed is 0, is always higher than the speed of the primary or the engine, the voltage of the secondary armature will be higher than the voltage of the primary armature, and thus the secondary may be used as a generator pumping current back into the primary; while at the same time the secondary is a fulcrum for the gearing. This condition is suitable for starting a heavily loaded car, or for running up a very steep hill. The condition will continue until the voltages of the primary and secondary become equal; that is, when the speed of the two armatures becomes the same.

With the gear ratios assumed, when the secondary speed is 0, the propeller speed is 5/9 of the primary speed; i. e., slightly more than half of the engine speed. This is a very convenient intermediate speed, for use in ordinary starting and on fairly steep hills.

In starting the car on either first or second speed, we must gradually bring the secondary armature to a stop from its original high speed and at the same time start the car from a standstill, entailing a very heavy original torque, which as the car is getting under way gradually grows less. In other words, the secondary armature should be made to react with a maximum from standstill of the car, gradually decreasing as acceleration proceeds. If the extra torque of the first position is not needed, the result is very conveniently and effectively accomplished by short circuiting the secondary armature on the series fields of the primary and secondary units, at the same time maintaining an independent initial excitation in the shunt fields furnished solely by the primary armature. This short circuit is first through the resistance (which is the second position) and then without resistance in the third position.

By reason of this shunt field excitation and the high original speed of the secondary armature, a high voltage is impressed upon the low resistance secondary short circuit, causing a very heavy current to flow in same, throwing a correspondingly heavy load on the secondary armature, resisting its rotation and starting the car. As the car speed increases, the secondary armature speed decreases, with a corresponding decrease in voltage and current, this latter, however, always remaining sufficient for the reaction at that time necessary, by reason of the independent shunt excitation. Since the shunt receives the entire output of the primary at this time, the voltage in the shunt may be increased as desired by increasing the speed of the engine. This ability to adjust the independent shunt excitation makes it possible to hold the car speed at any intermediate speeds up to that at which the secondary armature is ready to reverse its rotation.

The short circuited condition will hold until the secondary armature speed becomes 0, or is just reversed, revolving in the same direction as the primary. From here on the 4th and 5th positions of the controller are used, that is, the primary becomes a generator furnishing current and driving the secondary as a motor. This condition holds good until the speeds of all the members become the same, and the entire gearing revolves together.

If overspeed, that is, a propeller shaft speed higher than the engine speed, is desired, this may be accomplished by speeding up the secondary armature by shunting its fields or in some other conventional manner.

The neutral or cranking position has been arranged so that by closing the cranking switch a connection is made between the battery and the primary and secondary armature, revolving these armatures as motors in opposite directions, acting on the crank shaft of the engine and starting the engine.

The braking is effected by turning the controller from the cranking position in opposite direction. In this position the primary and secondary revolve in opposite directions, each tending to stop the other. The car driving the secondary unit and the primary acting to stop the rotation of the secondary, the stop will be gradual. The rush of current tends to retard abruptly the motion of the car but the resistance in the line may be selected to make the stop as gradual as desired.

Figure 6:
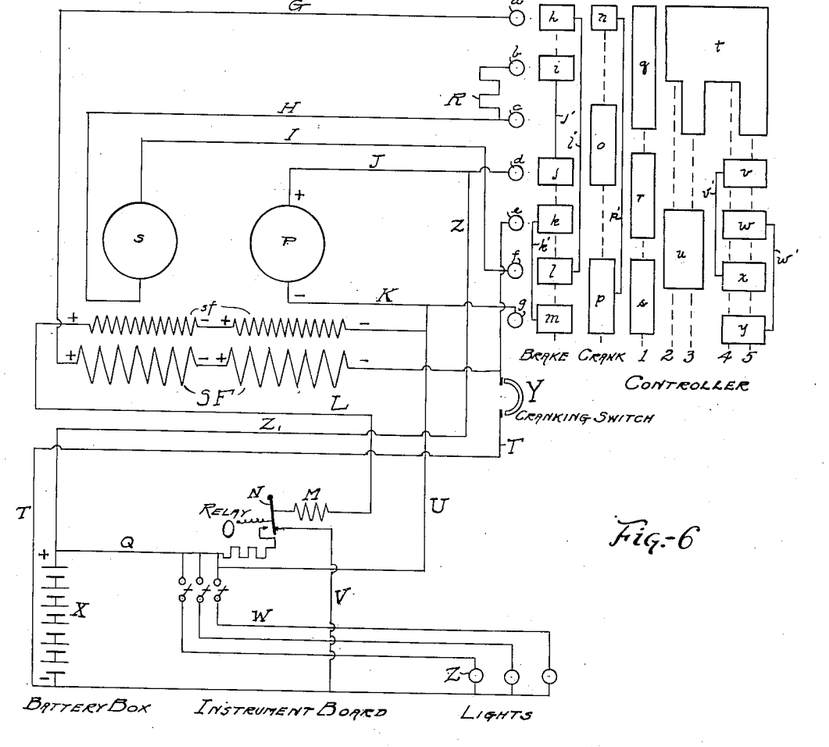
Fig. 6 is a diagram of a controller which may be employed, together with the various electric circuits controlled thereby.
Figure 7:
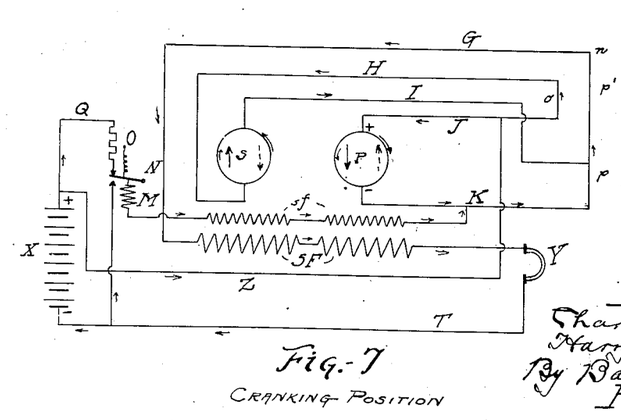
Figs. 7 to 11 are diagrams illustrating the particular circuits which are in use for various operations, Fig. 7 being for the cranking position, Fig. 8 for the brake, Fig. 9 for the first running position, Fig. 10 for the second and third running positions, and Fig. 11 for the fourth and fifth running position.

We will now describe the controller illustrated in Fig. 6, and the operation thereof for the various positions in the diagrams, Figs. 7-11. The full line straight arrows on the armatures indicate direction of current, and the dotted line arrows direction of the armature electro-motive force or voltage. If the current and electro-motive force are in the same direction, the machine is acting as a generator. If in the opposite direction, the machine is acting as a motor. The relay illustrated in Figs. 6 and 7 is designated to keep the battery out of action until the current generated by the machine has sufficient voltage to charge the battery. During this preliminary period the relay maintains in circuit a resistance as great as that of the battery. When the generator voltage is sufficient to charge the battery, the relay changes the circuit from this resistance to the battery, after which the battery is charged. This relay system of charging is described and claimed in Patent No. 1,352,166, issued Sept. 7, 1920, to C. E. F. Ahlm, one of the present patentees.

We will now describe the controller, and the circuits for the various positions, as illustrated in Figs. 6 to 11. Fig. 6 is a diagram of the controller and the circuits complete the controller barrel being disconnected from the contact fingers. In the controller, circles "a" to "q" inclusive indicate the contact fingers, while the rectangular members "h" to "y" inclusive are segments on a barrel, as will be well understood. The controller shown has seven positions, the position marked "crank" being also the neutral position. Right-hand turns from this neutral position carry the barrel successively to the positions 1, 2, 3, 4 and 5. Left-hand movement carries it to the brake position.

The same system of lettering applies to all of the circuit diagrams. P indicates the primary armature; S, the secondary armature; SF, the series field; sf, the shunt field, these fields being common to the two units. M indicates the magnet, and N the armature of the battery control relay. R indicates the main resistance, and O the resistance equivalent to that of the battery, which may be substituted for it by the relay MN. X indicates the battery; Y, the cranking or starting switch, and Z the lights. The various circuit lines are indicated by other capital letters.

In the neutral position, contact finger "a" engages plate "n"; fingers "c" and "d" engage and are connected by plate "o"; fingers "f" and "g" engage plate "p", and are thereby connected together, and are also connected by the controller barrel connection "p¹" to the plate "n" and the finger "a". This gives us the circuits in use, shown in Fig. 7. This is the neutral position when the cranking switch Y is open, and is the cranking position if this switch be closed.

Assuming that the switch Y is closed, as shown in Fig. 7, we may trace the circuits as follows:—From the plus side of the battery X, the current passes via the line Z to the line J, when it divides, part passing thru the primary P to the line K, thru the controller members "p", "p¹", "n" to the line G; thence thru the series field to the starting switch and via the line T to the negative side of the battery. Leading from the line J, the other branch carries battery current to the line H (thru controller plate "o"), thence thru the secondary to the line I, and thence at the controller plate "p" joining the line first described.

With the circuits, as described, we have battery current energizing both machines as motors to start the engine, at the same time some of the battery current passes by the line Q thru the resistance O and the relay NM thru the shunt field in the same direction as the current thru the series field to the line K. We thus have a highly energized double unit compound wound machine, all serving to rotate the engine with the maximum torque obtainable. We have, therefore, a highly efficient cranking machine.

Figure 9:
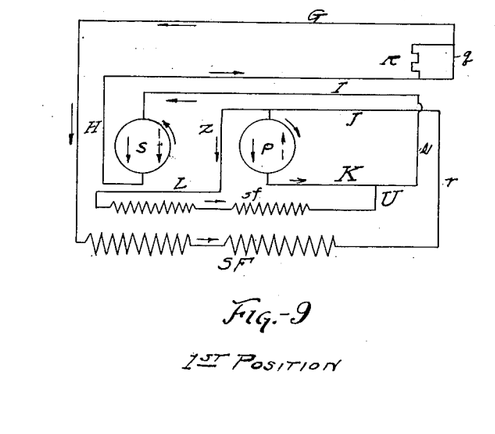

The first running position is illustrated in Fig. 9. In this position the secondary is acting as a generator, and the primary as a motor to add torque to the engine, and aid it in getting the vehicle under way. Starting to trace the circuit from the generator, or secondary, it passes by the line H to finger "c" and to the controller contact "q," which cuts out the resistance R, to the line G, thence thru the series field, finger "c" and contact plate "r" to finger "d", to the line J, whence it divides and passes partly thru the primary armature as a motor to the line K, to contact plate "s", to the line I, and back to the secondary. From the division point on the line J, current passes thru the shunt field in the same direction as the series field around the primary armature. If the relay be closed (as it will be until the machine is generating enough current to charge the battery) this shunt circuit will pass by the lines Z, Q, resistance O, relay NM, line L thru the shunt field, thru the line J to the line K.

If the current has sufficient voltage to cause the magnet M to overcome the relay spring, this shunt current passes from the line Z, thru the battery X, to the line V, and thence to the line L. In either case, the resistance added to the shunt is substantially the same.

It will be seen that in this first running position we have a compound machine, wherein the two fields are cumulative, and the secondary is acting as a generator without resistance in its armature circuit, thus producing a high current which acts on the primary as a motor, aiding the engine. This aid allows the engine to keep up its desired speed of rotation, notwithstanding the increased torque required in getting the vehicle under way.

Figure 10:
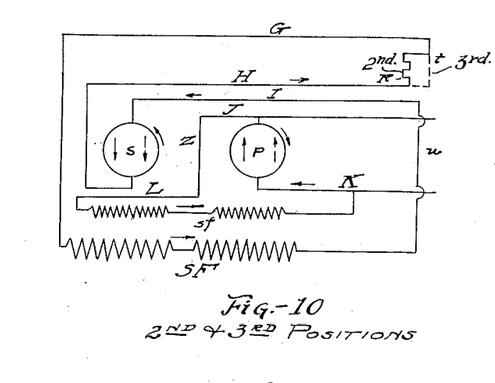
Figure 11:
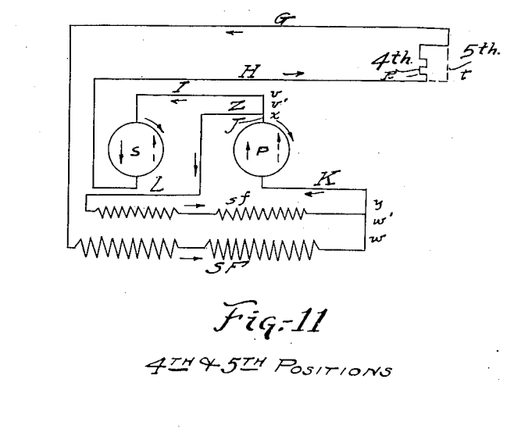

In the second and third running positions, illustrated in Fig. 10, the connections are such that both the primary and secondary are generators. In these positions it is not necessary to use either electric unit as a motor, and hence the entire generator current is available for charging the battery. These may be said to be the usual accelerating positions. They differ from each other only in that in the second position the main resistance R is in circuit, while in the third position it is cut out.

Tracing the circuits in Fig. 10 from the primary, we pass by the line J, to the line Z, to the line L (ordinarily thru the battery X, and the line V) thru the shunt to the line K and back to the armature. From the secondary generator, we pass by the line H (thru the resistance R for the second position and around this resistance via the contact plate "$t$" for the third position) thru the line G, thence thru the series field, to finger "$e$," thru the contact plate "$u$" to finger "$f$" to the line I, and back to the secondary.

In the second and third positions, therefore, we have two independent generators, the primary being in series with the shunt field, and the secondary being in series with the series fields. These fields are energized in the same direction, and each armature obtains the benefit of both fields, and this current is produced to charge the battery. The secondary rotates in the opposite direction to the primary to give the desired speed to the propeller shaft. Cutting out of the resistance lowers the speed of the secondary, and thus increases the speed of the propeller shaft.

In the fourth and fifth positions, the primary is a generator, while the secondary is a motor rotating in the same direction as the primary, thus giving a speed to the propeller shaft higher than the previous positions, this increase being moderate in the fourth position, where the resistance R is in circuit, and further increased in the fifth position where this resistance is cut out. Tracing the circuit in Fig. 11 from the primary generator, it divides at the line J, and passes via Z and L (intermediately ordinarily thru the battery), thru the shunt and back to the primary armature. The other branch of the circuit leads from the primary via the line J thru the contact plate "$v$" to the connection bars "$v^1$" and contact plate "$x$" to the line I, thru the secondary armature as a motor, thence to the line H, thence thru the resistance R or around it to the line G, and thru the series field; from thence the line passes to the contact plate "$w$," connection bar "$w^1$," contact plate "$y$," and back via the line K to the primary armature.

Figure 8:
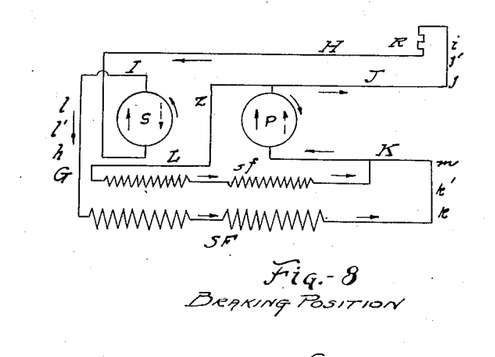

To effect an electric brake, we simply turn the controller barrel from any running position past the neutral position to the braking position, wherein the first set of contacts in Fig. 6 makes contact with the controller fingers ($a$, $b$, $d$, $e$, $f$, $g$). The circuits, which are thus established, are indicated in Fig. 8. In this position the primary becomes a generator tending to operate the secondary as a motor in the reverse direction to its then rotating direction, and thus bring the machine to an abrupt stop. The abruptness being softened by the inclusion of the resistance R.

Tracing the circuits for the electric brake, we pass from the primary generator via the line J, to contact plate "$j$," and controller connection "$j^1$" and plate "$i$," thru the resistance R to the line H, thence thru the secondary to the line I; from thence we pass the contact plate "$l$," controller connection "$l^1$," plate "$h$," to the line G; thence thru the series field to the plate "$k$," controller connection "$k^1$," plate "$m$," back via the line K to the primary armature. The shunt line passes from the line J via the lines Z and L, thru the shunt field back to the line K.

It will be seen from the description of the different circuits and positions that our apparatus is adapted to provide for all conditions desired in the operation of a gas-driven automobile. The apparatus acts first as an efficient cranking machine to speed up the engine sufficiently to operate under its own power. In running the machine generates the current necessary to charge the battery. Accordingly, the necessity for a special charging generator and starting motor is avoided. In running positions, the machine first contributes a high torque to the engine shaft, then gradually speeds up the propeller shaft, and may finally cause it to have a speed exceeding that of the engine, where conditions require only a light torque. This gives a wide range of power, dispensing with the usual gear transmission and avoiding the jerks incident to passing from one gear connection to another. Finally, by simple movement of the controller handle, the machine becomes a powerful electric brake, which gives an additional and desirable control of the automobile. All of these desired results are accomplished by a machine which is comparatively simple, and may be embodied in a comparatively light construction, and in a compact and small unit well suited in installation of an automobile.

Having thus described our invention, we claim:

1. The combination with a driving member, and a driven member, of a primary armature and a secondary armature, one of said armatures being connected with one of said members, and epicyclic gearing connecting the other armature with both of said members, series and shunt field windings, each common to both armatures and means enabling one armature to excite the series field windings for both armatures and the other armature to simultaneously excite the shunt field of both armatures.

2. The combination with a driven member and a driving member, of a primary and a secondary armature, one of said armatures being connected with one of said members, and epicyclic gearing connecting the other armature with both of said members, field windings for each armature and means for enabling each armature to excite a field winding for both armatures simultaneously.

3. The combination with a driven member and a driving member, a gear train, primary and secondary armatures, one connected with one of said members, and the other connected by the gearing with both members, field windings for the armatures and means for simultaneously exciting a portion of the field windings for both armatures solely by the operation of the other armature.

4. The combination with a drive shaft and a driven shaft, of shunt and series field windings, primary and secondary armatures, a gear train, one armature being directly connected with one shaft and the other reactively connected by the gearing with both shafts, field windings for the armatures and means for simultaneously maintaining an independent excitation in the field winding of each armature by current derived solely from the other armature.

5. The combination with a drive shaft and a driven shaft, of a primary armature and a secondary armature, one of said armatures being directly connected with one of said shafts, and gearing connecting the other armature with both of said shafts, and series and shunt field windings for the two armatures, and means for connecting the shunt field windings to one of the armatures.

6. The combination with a drive shaft and a driven shaft, of a primary armature directly connected with the drive shaft, a secondary armature connected by planetary gearing with both the drive shaft and the driven shaft, series and shunt field windings common to both armatures, and means for connecting the shunt field windings to one of the armatures.

7. The combination with a driving member and a driven member, of a primary armature and a secondary armature, one of said armatures being directly connected with one of said members, and gearing connecting the other armature with both of said members, series and shunt field windings for the two armatures, and means for short circuiting the shunt winding on one of the armatures and short circuiting the series winding on the other armature.

8. The combination with a drive shaft and a driven shaft, of shunt and series field windings, a primary armature and a secondary armature, the primary being directly connected with one of the shafts and the other being connected with both shafts thru reaction gearing, series and shunt field windings, and means for short circuiting the secondary armature on the series field windings of the primary and secondary units, and means for maintaining an independent initial excitation in the shunt field windings by current furnished by the primary armature.

9. The combination with a driving member and a driven member, primary and secondary armatures, one connected with one of said members, and the other connected thru gearing with both members, series and shunt field windings, and means for exciting the shunt field windings of either armature by the current flowing from the other armature, the series field windings being at the same time connected in series only with the armature not connected to the shunt field windings.

10. The combination with a primary armature and a secondary armature, a driving member directly connected with one of the armatures, a driven member connected thru reaction gearing with the other armature and the driving member, series field windings and shunt field windings for the two armatures, and means for connecting the series field windings in series with both armatures and for connecting the shunt field windings about the primary armature.

11. The combination with a primary armature and a secondary armature, a driving member directly connected with the primary armature, a driven member connected thru reaction gearing with the secondary armature and the driving member, series field windings and shunt field windings, each common to the two armatures, and means for connecting the series windings in series with both armatures and at the same time connecting the shunt field windings about one machine.

12. The combination with a primary armature and a secondary armature, a driving member directly connected with one of the armatures, a driven member connected thru reaction gearing with the other armature and the driving member, series field windings and shunt field windings for the two armatures, and a controller adapted in one position to connect the series winding in series with both armatures while the shunt field windings are connected about one armature only, and in another position to short circuit one armature on the shunt field windings and the other on the series field windings.

13. The combination with a primary armature and a secondary armature, a driving member directly connected with one of the armatures, a driven member connected thru reaction gearing with the other armature and the driving member, series field windings and shunt field windings for the two armatures, and a controller adapted to connect the series winding in series with both armatures and the shunt field windings about the primary armature, and to change the direction of current so that the armatures may rotate either in the same or in opposite directions as desired.

14. The combination with a primary armature and a secondary armature, a driving member directly connected with one of the armatures, a driven member connected thru reaction gearing with the other armature and the driving member, series field windings and shunt field windings common to the two armatures, and means for connecting the series field winding in series with a divided circuit which passes thru both armatures in multiple, and a battery adapted to be put in series with said series field.

15. The combination with a primary armature and a secondary armature, a driving member directly connected with one of the armatures, a driven member connected thru reaction gearing with the other armature and the driving member, series field windings and shunt field windings, and means for connecting the series field windings in series with a battery and with a divided circuit which passes thru both armatures, and means for placing the shunt field windings in a further divided circuit in parallel with the two armatures.

16. The combination with a primary armature and a secondary armature, a driving member directly connected with one of the armatures, a driven member connected thru reaction gearing with the other armature and the driving member, series field windings and shunt field windings for the two armatures, and a controller adapted in one position to connect the series windings in series with both armatures so as to cause them to rotate in opposite directions, and in another position to short circuit each set of the field windings independently on the two armatures respectively, and in another position to connect the series field windings in series with both armatures, but so as to cause them to rotate in the same direction.

17. The combination with a driven member, of a pair of armatures, planetary gearing connecting such three members, and a field structure on opposite sides of the two armatures and common to both of them.

18. The combination with a driven member, of a pair of armatures, planetary gearing connecting such three members, and shunt and series field windings on opposite sides of the two armatures and common to both of them.

19. The combination with a driving member and a driven member, of a pair of armatures side by side, one of them connected with the driving member, planetary gearing connecting the other armature with the driving member and the driven member, and a field structure common to both armatures and including pole pieces on opposite sides of the two armatures.

20. The combination with a main shaft and a driven shaft, of a pair of armatures side by side, one of them connected with the main shaft, planetary gearing connecting the other armature with the main shaft and the driven shaft, and shunt and series field windings common to both armatures, and located on opposite sides of the two armatures.

21. The combination of two rotary armatures adjacent to each other, a field structure common to the two armatures and having pole pieces on opposite sides of the two, each armature serving to carry the lines of force for the other armature, a rotary propeller and planetary gearing between it and the two armatures.

22. The combination of a main shaft, an armature thereon, a sleeve loosely surrounding the main shaft, an armature on the sleeve adjacent to the armature on the main shaft, a field structure embracing the two armatures and having its poles on the opposite sides of the armatures, a propeller shaft and planetary gearing between the same and the main shaft and the sleeve.

23. The combination of two independently rotary armatures and a rotary member to be propelled, planets geared with such three members and mounted on a rotary carrier which is rotatable independently of either armature and of the member to be propelled, and means for controlling the rotation of the carrier.

24. In a change speed gearing, the combination of a driving member, a driven member, two armatures, one connected with the driving member, planetary gearing connecting the other armature with both the driving member and the driven member, said planetary gearing including a rotary member which is rotatable independently of either armature and the driving member and driven members and means for controlling the rotation thereof.

25. In a change speed gearing, the combination of a driving shaft and a driven shaft, two armatures, one connected directly to the driving shaft, a field structure including series and shunt field windings for both armatures, planetary gearing connecting the other armature with both the driving shaft and the driven shaft, said planetary gearing including a rotary member and means for applying a brake action to such members whereby the direction of rotation of the last named armature may be reversed.

26. The combination of a driving member, a driven member, a rotary armature connected with the driving member, a second rotary armature, a field structure coacting with both armatures planetary gearing, the planets of which connect with gears on fixed axes on the driving member, the driven member and the second armature respectively.

27. The combination of a driving shaft, a sun gear thereon, a driven shaft having a gear, a planet connecting said sun gear with the gear on the driven shaft, an armature rotatable with the driving shaft, a second armature geared with said planet, and a field structure coacting with both armatures.

28. The combination of a pair of armatures, a driving member rotating with one of them and having a gear, a driven member having a gear, planetary gearing connecting the other armature with the gears on the driving and driven members, a rotary carrier for the planets of said planetary gearing movable independently of the driving and driven members, and means for controlling the rotation of said carrier.

29. The combination of a driving shaft, a driven shaft, a rotary armature connected with the driving shaft, a second rotary armature, planetary gearing comprising planets which connect with a gear on the driven shaft and with sun gears on the driving shaft and on the second armature, and a carrier for the planets, and means for applying the brake to said carrier.

30. The combination of a primary armature, a sun gear rotatable therewith, a driven member having a gear, a planet connected with said sun gear and with the gear on the driven member, and a second armature gear connected with said planet, there being an idler in the planetary connection.

31. The combination of a driving shaft, an armature driven thereby, a propeller shaft having a gear, a second armature, a planetary gearing which connects with the gear on the propeller shaft, and gears on the driving shaft and on the second armature, said planetary gearing having an idler to reverse the direction of rotation of one armature relative to the other.

32. The combination of two rotary armatures, each having a sun gear, a rotary driven member having an internal gear, and planets meshing with the sun gears and the internal gear.

33. The combination of a main shaft, a driven shaft having an internal gear, a sun on the main shaft, a rotary planet carrier, a planet carried thereby and connected with the sun and the internal gear, a primary armature connected with the main shaft, and a secondary armature having a sun geared with said planet.

34. The combination of a main shaft, a driven shaft aligned therewith and having a head with an internal gear, a sun on the main shaft within the internal gear, a rotary planet carrier, a planet carried thereby and connected with the sun and the internal gear, a primary armature connected with the main shaft, and a secondary armature having a sun geared with said planet through an interposed idler.

35. The combination of a main shaft, a propeller shaft having an internal gear, a primary armature connected with the main shaft, a secondary armature, planetary gearing connecting the secondary armature with the main shaft and with the gear on the propeller shaft, said planetary gearing having a rotary planet carrier, and means for controlling the rotation of said carrier.

36. The combination of a main shaft, a primary armature thereon, a sleeve surrounding the main shaft, a secondary armature on said sleeve, a propeller shaft having a gear, planetary gearing, the planets of which are carried by a rotary carrier and connected with the gear on the propeller shaft and with gears on the main shaft and on said sleeve.

37. The combination of a main shaft, a primary armature thereon, a sleeve surrounding the main shaft, a secondary armature on said sleeve, a propeller shaft having a gear, planetary gearing, the planets of which are carried by a rotary carrier and connected with a sun on the main shaft, a sun on said sleeve and a gear on the propeller shaft, a drum connected with said planetary carrier, and a brake band acting on said drum.

38. The combination of a driving shaft, an armature driven thereby, a driven shaft, a gear carried thereby, a secondary armature, a sleeve on which it is mounted, suns on the main shaft and the sleeve, a rotating carrier, planets mounted thereon connected with the gear on the driven shaft and with the suns, one of said connections being through an idler, and means for applying a brake to the planetary carrier.

39. The combination of a driving shaft, a sun gear thereon, a driven shaft, an internal gear on the driven shaft, a planet meshing with said sun gear and internal gear, a secondary planet rigid with the planet mentioned, a sleeve surrounding said driving shaft, a sun gear thereon, and an idler gear between the last mentioned sun and said second planet, armatures respectively connected with the driving shaft and said sleeve, and a controller and circuits for controlling the armature on the sleeve.

40. The combination of a main shaft, a propeller shaft, a gear thereon, a primary armature connected with the main shaft, a secondary armature, planetary gearing connecting the secondary armature with the main shaft and with the gear on the propeller shaft, a rotary housing inclosing the planetary gearing and carrying the planets, and a brake adapted to act on said housing.

41. The combination of two rotary armatures and a driven shaft having an internal gear, a sun connected with one armature, a revoluble planetary carrier, a planet carried by said carrier and connected with the sun and the internal gear, a gear on the other armature connected with the planet, said planet carrier being connected with a rotary housing enclosing the planetary gearing, a brake and means for applying it to the exterior of said housing.

42. The combination of a main shaft, a driven shaft aligned therewith and having an internal gear, a sun on the main shaft within the internal gear, a planetary carrier revoluble about the main shaft, a planet carried by said carrier and connected with the sun and the internal gear, a sleeve surrounding the main shaft, a sun thereon geared with the said planet by means of an idler carried by the said planet carrier, said planet carrier being connected with a rotary housing enclosing the planetary gearing, a brake band and means for applying it to the exterior of said housing, and rotary armatures connected respectively with the main shaft and with said sleeve.

43. The combination of a main shaft, a disc-like armature thereon, a sleeve surrounding the main shaft, a disc-like armature on said sleeve alongside of the armature first mentioned, a casing surrounding the shaft, pole pieces carried on the interior of the casing on opposite sides of the two armatures, windings for said pole pieces, a propeller shaft and planetary gearing between the main shaft and the sleeve and the propeller shaft, including a rotary planet carrier having planets connected with gears on fixed axes on the main shaft and on the sleeve and on the propeller shaft, and means for applying a brake to the planet carrier.

44. The combination of a main driving shaft, a sleeve thereon, a stationary hollow frame about the shaft, pole pieces carried on the interior of the frame, a pair of armatures side by side operating between the pole pieces and one mounted on the shaft and the other on the sleeve, a propeller shaft, a gear on the propeller shaft, a gear on the driving shaft, and a gear on the sleeve, planets meshing with said gears, a rotary drum carrying said planets, and means for applying a brake to said drum.

45. In an apparatus of the character described, the combination of two rotatable armatures mounted in inductive relation, field windings disposed on opposite sides of the armatures and conductively connected, including series field windings and shunt field windings for the armatures, and a controller adapted in one position to connect the series windings in series with both armatures while the shunt field windings are connected about one armature only and in another position to short circuit one armature on a shunt field winding and the other on the series field winding.

46. In an apparatus of the character described, the combination of a driving and a driven armature, field windings disposed on opposite sides of the armatures including series and shunt field windings disposed on poles adjacent the side surfaces of the armatures, and controller means for alternately connecting the series field windings to one or both of the armatures and the shunt field windings for both armatures to one of the armatures.

In testimony whereof, we hereunto affix our signatures.

CHARLES E. F. AHLM.
HARRY Y. HALL.